US008937670B2

(12) United States Patent
Kudo

(10) Patent No.: US 8,937,670 B2
(45) Date of Patent: Jan. 20, 2015

(54) PROCESSING VIDEO SIGNAL IMAGING APPARATUS AND PROCESSING VIDEO SIGNAL IMAGING METHOD

(75) Inventor: Yuma Kudo, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 446 days.

(21) Appl. No.: 13/304,139

(22) Filed: Nov. 23, 2011

(65) Prior Publication Data

US 2012/0293691 A1   Nov. 22, 2012

(30) Foreign Application Priority Data

May 16, 2011   (JP) ................................ 2011-109915

(51) Int. Cl.
*H04N 5/217*   (2011.01)
*H04N 5/365*   (2011.01)
*H04N 5/225*   (2006.01)

(52) U.S. Cl.
CPC ............... *H04N 5/217* (2013.01); *H04N 5/365* (2013.01); *H04N 2005/2255* (2013.01)
USPC ........................................................ 348/241

(58) Field of Classification Search
USPC ................. 348/222.1, 241, 243, 251
See application file for complete search history.

(56) References Cited

U.S. PATENT DOCUMENTS

| | | | | |
|---|---|---|---|---|
| 5,272,536 A * | 12/1993 | Sudo et al. | ..................... | 348/243 |
| 6,906,704 B2 * | 6/2005 | Matsutani et al. | ............ | 345/204 |
| 7,623,729 B2 * | 11/2009 | Ito | ................................. | 382/275 |
| 7,683,956 B2 * | 3/2010 | Honda et al. | .................. | 348/311 |
| 7,710,483 B2 * | 5/2010 | Kato | ............................. | 348/311 |
| 7,847,849 B2 * | 12/2010 | Kato | ............................. | 348/314 |
| 7,924,329 B2 * | 4/2011 | Suzuki et al. | ................. | 348/241 |
| 8,218,036 B2 * | 7/2012 | Kobayashi | .................... | 348/241 |
| 8,243,173 B2 * | 8/2012 | Utsugi | ......................... | 348/241 |
| 8,514,302 B2 * | 8/2013 | Utsugi | ......................... | 348/241 |
| 8,563,915 B2 * | 10/2013 | Takenaka et al. | .......... | 250/208.1 |
| 2002/0003581 A1 * | 1/2002 | Sato et al. | ................ | 348/333.11 |

(Continued)

FOREIGN PATENT DOCUMENTS

| | | |
|---|---|---|
| DE | 698 18 790 | 8/2004 |
| EP | 0926885 | 6/1999 |

(Continued)

OTHER PUBLICATIONS

Japanese Patent Application No. 2011-109915, Notice of Reasons for Rejection, mailed May 22, 2012, (with English Translation).

(Continued)

*Primary Examiner* — Nicholas Giles
(74) *Attorney, Agent, or Firm* — Blakely, Sokoloff, Taylor & Zafman LLP

(57) ABSTRACT

An imaging apparatus of an embodiment includes a captured video signal outputting unit, a data outputting unit, a supplement processing unit, and a video processing unit. The captured video signal outputting unit outputs a captured video signal related to video captured using an image capturing element. The data outputting unit outputs part of data related to the image capturing elements stored in a storage unit. The supplement processing unit receives the outputted part of the data related to the image capturing elements and uses the received part of the data related to the image capturing elements to perform supplement processing of the data. The video processing unit performs video processing of the outputted captured video signal using the supplement processed data and outputs a video signal.

18 Claims, 14 Drawing Sheets

(56) References Cited

U.S. PATENT DOCUMENTS

| | | | |
|---|---|---|---|
| 2003/0080340 A1* | 5/2003 | Henderson et al. | 257/72 |
| 2005/0073597 A1* | 4/2005 | Rengakuji et al. | 348/241 |
| 2006/0262204 A1* | 11/2006 | Dosluoglu | 348/241 |
| 2008/0018770 A1* | 1/2008 | Kato | 348/314 |
| 2008/0074527 A1* | 3/2008 | Kato | 348/311 |
| 2009/0201403 A1* | 8/2009 | Kim et al. | 348/302 |
| 2009/0278963 A1* | 11/2009 | Shah et al. | 348/241 |
| 2010/0157113 A1* | 6/2010 | Kobayashi | 348/243 |
| 2010/0182452 A1* | 7/2010 | Utsugi | 348/231.2 |
| 2010/0182462 A1* | 7/2010 | Utsugi | 348/241 |

FOREIGN PATENT DOCUMENTS

| | | |
|---|---|---|
| JP | 11-196332 | 7/1999 |
| JP | 2003-079569 | 3/2003 |
| JP | 2008-172606 | 7/2008 |
| JP | 2011-010113 | 1/2011 |

OTHER PUBLICATIONS

English Translation of JP 2011-010113, 2011.
English Translation of JP 2008-172606, 2008.

* cited by examiner

Mg=R+B

Cy=G+B

Ye=R+G

FIXED PATTERN NOISE DATA OF RESPECTIVE PIXELS OF IMAGE SENSOR

D — NOISE DATA WHICH ARE THINNED AND TRANSMITTED FIRST

☐ — DATA UNTRANSMITTED

FIG. 7

| D |  | D |  | D |  | D |  | D |  | D |  | D |  |
|---|---|---|---|---|---|---|---|---|---|---|---|---|---|
|  | D |  | D |  | D |  | D |  | D |  | D |  | D |
| D |  | D |  | D |  | D |  | D |  | D |  | D |  |
|  | D |  | D |  | D |  | D |  | D |  | D |  | D |
| D |  | D |  | D |  | D |  | D |  | D |  | D |  |
|  | D |  | D |  | D |  | D |  | D |  | D |  | D |
| D |  | D |  | D |  | D |  | D |  | D |  | D |  |
|  | D |  | D |  | D |  | D |  | D |  | D |  | D |
| D |  | D |  | D |  | D |  | D |  | D |  | D |  |
|  | D |  | D |  | D |  | D |  | D |  | D |  | D |

74a

| D | NOISE DATA WHICH ARE TRANSMITTED FIRST |
|---|---|
|   | DATA UNTRANSMITTED |

FIG. 8A

| 81a | 1 | 1 | 1 | 1 | 1 | 1 | 1 | 1 | 1 | 1 | 1 | 1 | 1 | 1 |

☐ 1  NOISE DATA WHICH ARE TRANSMITTED FIRST

☐  DATA UNTRANSMITTED

FIG. 8B

☐ 2  NOISE DATA WHICH ARE TRANSMITTED SECOND

☐  DATA UNTRANSMITTED

FIG. 8C

| | 3 | NOISE DATA WHICH ARE TRANSMITTED THIRD |
|---|---|---|
| | ☐ | DATA UNTRANSMITTED |

FIG. 8D

4 — NOISE DATA WHICH ARE TRANSMITTED FOURTH

FIG. 9C

| | 93a | | | 93b | | | 93c | | | 93d | |
|---|---|---|---|---|---|---|---|---|---|---|---|
| 1 | 3 | 2 | 1 | 3 | 2 | 1 | 3 | 2 | 1 | 3 | |
| 1 | 3 | 2 | 1 | 3 | 2 | 1 | 3 | 2 | 1 | 3 | |
| 1 | 3 | 2 | 1 | 3 | 2 | 1 | 3 | 2 | 1 | 3 | |
| 1 | 3 | 2 | 1 | 3 | 2 | 1 | 3 | 2 | 1 | 3 | |
| 1 | 3 | 2 | 1 | 3 | 2 | 1 | 3 | 2 | 1 | 3 | |
| 1 | 3 | 2 | 1 | 3 | 2 | 1 | 3 | 2 | 1 | 3 | |
| 1 | 3 | 2 | 1 | 3 | 2 | 1 | 3 | 2 | 1 | 3 | |
| 1 | 3 | 2 | 1 | 3 | 2 | 1 | 3 | 2 | 1 | 3 | |
| 1 | 3 | 2 | 1 | 3 | 2 | 1 | 3 | 2 | 1 | 3 | |
| 1 | 3 | 2 | 1 | 3 | 2 | 1 | 3 | 2 | 1 | 3 | |

| 3 | NOISE DATA WHICH ARE TRANSMITTED THIRD |
|---|---|
| | DATA UNTRANSMITTED |

FIG. 9D

| | 94a | | | | 94b | | | | 94c | | | |
|---|---|---|---|---|---|---|---|---|---|---|---|---|
| 1 | 3 | 2 | 4 | 1 | 3 | 2 | 4 | 1 | 3 | 2 | 4 | 1 | 3 |
| 1 | 3 | 2 | 4 | 1 | 3 | 2 | 4 | 1 | 3 | 2 | 4 | 1 | 3 |
| 1 | 3 | 2 | 4 | 1 | 3 | 2 | 4 | 1 | 3 | 2 | 4 | 1 | 3 |
| 1 | 3 | 2 | 4 | 1 | 3 | 2 | 4 | 1 | 3 | 2 | 4 | 1 | 3 |
| 1 | 3 | 2 | 4 | 1 | 3 | 2 | 4 | 1 | 3 | 2 | 4 | 1 | 3 |
| 1 | 3 | 2 | 4 | 1 | 3 | 2 | 4 | 1 | 3 | 2 | 4 | 1 | 3 |
| 1 | 3 | 2 | 4 | 1 | 3 | 2 | 4 | 1 | 3 | 2 | 4 | 1 | 3 |
| 1 | 3 | 2 | 4 | 1 | 3 | 2 | 4 | 1 | 3 | 2 | 4 | 1 | 3 |
| 1 | 3 | 2 | 4 | 1 | 3 | 2 | 4 | 1 | 3 | 2 | 4 | 1 | 3 |
| 1 | 3 | 2 | 4 | 1 | 3 | 2 | 4 | 1 | 3 | 2 | 4 | 1 | 3 |

| 4 | NOISE DATA WHICH ARE TRANSMITTED FOURTH |
|---|---|

FIG. 10C

| 1 | 3 | 2 | 3 | 1 | 3 | 2 | 3 | 1 | 3 | 2 | 3 | 1 | 3 |
|---|---|---|---|---|---|---|---|---|---|---|---|---|---|
|   | 2 |   | 2 |   | 2 |   | 2 |   | 2 |   | 2 |   | 2 |
| 2 | 3 | 1 | 3 | 2 | 3 | 1 | 3 | 2 | 3 | 1 | 3 | 2 | 3 |
|   | 2 |   | 2 |   | 2 |   | 2 |   | 2 |   | 2 |   | 2 |
| 1 | 3 | 2 | 3 | 1 | 3 | 2 | 3 | 1 | 3 | 2 | 3 | 1 | 3 |
|   | 2 |   | 2 |   | 2 |   | 2 |   | 2 |   | 2 |   | 2 |
| 2 | 3 | 1 | 3 | 2 | 3 | 1 | 3 | 2 | 3 | 1 | 3 | 2 | 3 |
|   | 2 |   | 2 |   | 2 |   | 2 |   | 2 |   | 2 |   | 2 |
| 1 | 3 | 2 | 3 | 1 | 3 | 2 | 3 | 1 | 3 | 2 | 3 | 1 | 3 |
|   | 2 |   | 2 |   | 2 |   | 2 |   | 2 |   | 2 |   | 2 |

[3] NOISE DATA WHICH ARE TRANSMITTED THIRD

[ ] DATA UNTRANSMITTED

FIG. 10D

| 1 | 3 | 2 | 3 | 1 | 3 | 2 | 3 | 1 | 3 | 2 | 3 | 1 | 3 |
|---|---|---|---|---|---|---|---|---|---|---|---|---|---|
| 4 | 2 | 4 | 2 | 4 | 2 | 4 | 2 | 4 | 2 | 4 | 2 | 4 | 2 |
| 2 | 3 | 1 | 3 | 2 | 3 | 1 | 3 | 2 | 3 | 1 | 3 | 2 | 3 |
| 4 | 2 | 4 | 2 | 4 | 2 | 4 | 2 | 4 | 2 | 4 | 2 | 4 | 2 |
| 1 | 3 | 2 | 3 | 1 | 3 | 2 | 3 | 1 | 3 | 2 | 3 | 1 | 3 |
| 4 | 2 | 4 | 2 | 4 | 2 | 4 | 2 | 4 | 2 | 4 | 2 | 4 | 2 |
| 2 | 3 | 1 | 3 | 2 | 3 | 1 | 3 | 2 | 3 | 1 | 3 | 2 | 3 |
| 4 | 2 | 4 | 2 | 4 | 2 | 4 | 2 | 4 | 2 | 4 | 2 | 4 | 2 |
| 1 | 3 | 2 | 3 | 1 | 3 | 2 | 3 | 1 | 3 | 2 | 3 | 1 | 3 |
| 4 | 2 | 4 | 2 | 4 | 2 | 4 | 2 | 4 | 2 | 4 | 2 | 4 | 2 |

[4] NOISE DATA WHICH ARE TRANSMITTED FOURTH

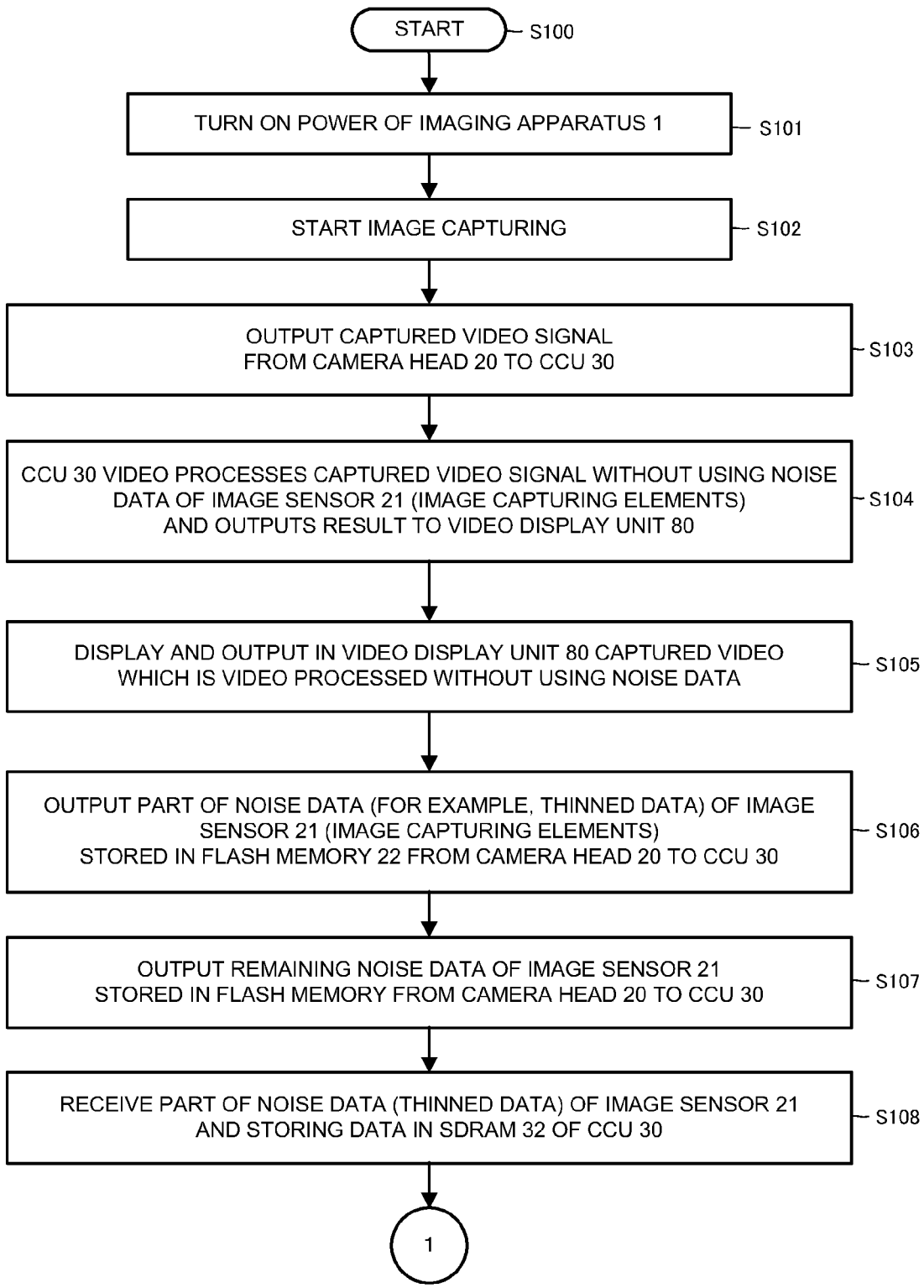

PROCESSING VIDEO SIGNAL IMAGING APPARATUS AND PROCESSING VIDEO SIGNAL IMAGING METHOD

CROSS-REFERENCE TO RELATED APPLICATION

This application is based upon and claims the benefit of priority from the prior Japanese Patent Application No. 2011-109915, filed on May 16, 2011; the entire contents of which are incorporated herein by reference.

FIELD

Embodiments described herein related generally to an imaging apparatus and an imaging method.

BACKGROUND

In recent years, imaging apparatuses which perform image capturing using an image sensor such as a CCD image sensor (Charge Coupled Device Image Sensor) or a CMOS image sensor (Complementary Metal Oxide Semiconductor Image Sensor) are in widespread use.

In an image sensor, a large number, several hundred or more for example, of image capturing elements (pixels) are used, and these image capturing elements (pixels) each have fixed pattern noise. As an example of the fixed pattern noise, there is dark current shading or the like for example.

It is possible that data related to the fixed pattern noise are measured in advance and stored in a camera head or the like, and when the imaging apparatus is activated, for example, they are read and sent to a CCU (Camera Control Unit) or the like to be used for video processing of a captured video signal or the like.

However, as described above, the image sensor has a large number of image capturing elements (pixels) which each have fixed pattern noise, and thus it has been time consuming to transmit the fixed pattern noise to the CCU or the like. That is, in an imaging apparatus such as an endoscope, the amount of data related to noise data or the like of image capturing elements stored in a head unit has become large. Accordingly, a transmitting time for sending these data to a control unit such as the CCU becomes long, and it will take much time to output video on which the noise data of the image capturing elements are reflected.

Thus, it is possible that, for example, a time of about ten seconds is taken from turning on the power of the imaging apparatus until outputting video on which data related to the fixed pattern noise of the above-described image sensor are reflected.

BRIEF DESCRIPTION OF THE DRAWINGS

FIG. 7 is a diagram illustrating another example of the fixed pattern noise data to be thinned and transmitted in the imaging apparatus according to the embodiment.

FIG. 8A to FIG. 8D are diagrams illustrating other examples of the fixed pattern noise data to be thinned and transmitted in the imaging apparatus according to the embodiment.

FIG. 9A to FIG. 9D are diagrams illustrating other examples of the fixed pattern noise data to be thinned and transmitted in the imaging apparatus according to the embodiment.

FIG. 10A to FIG. 10D are diagrams illustrating other examples of the fixed pattern noise data to be thinned and transmitted in the imaging apparatus according to the embodiment.

FIGS. 11A and 11B are flowcharts describing operation of the imaging apparatus according to the embodiment.

DETAILED DESCRIPTION

Figure 1:
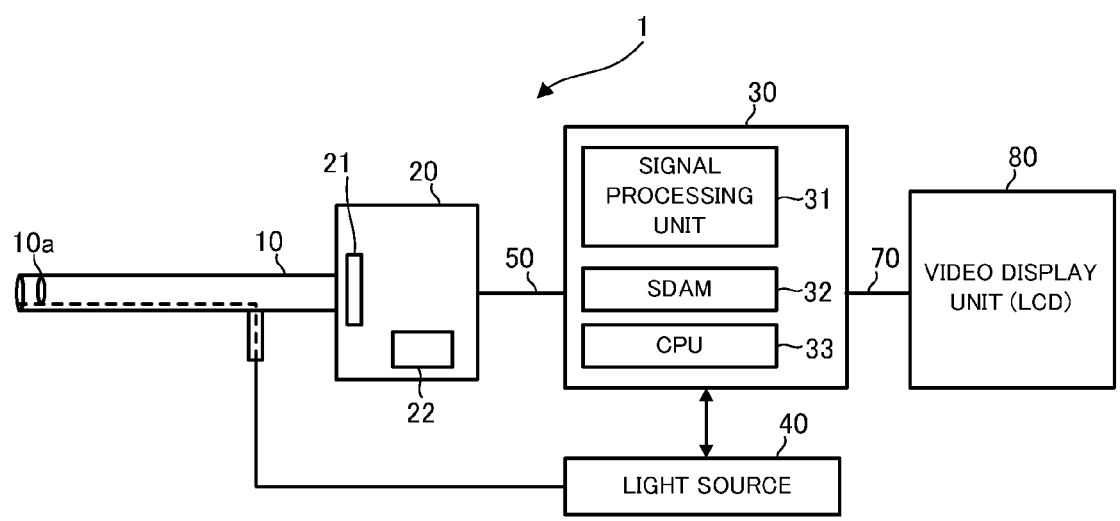
FIG. 1 is a diagram illustrating an example of the structure of an imaging apparatus according to an embodiment.

An imaging apparatus of an embodiment includes a captured video signal outputting unit, a data outputting unit, a supplement processing unit, and a video processing unit. The captured video signal outputting unit outputs a captured video signal related to video captured using an image capturing element. The data outputting unit outputs part of data related to the image capturing elements stored in a storage unit. The supplement processing unit receives the outputted part of the data related to the image capturing elements and uses the received part of the data related to the image capturing elements to perform supplement processing of the data. The video processing unit performs video processing of the outputted captured video signal using the supplement processed data and outputs a video signal.

Hereinafter, an embodiment will be described with reference to the drawings. In this embodiment, a structure will be described using a head detachable endoscope as an example of an imaging apparatus.

In an imaging apparatus (solid-state imaging camera) using a solid-state image capturing element such as a CCD sensor, a CMOS sensor, or the like for an image capturing unit (image sensor), deterioration in picture quality easily occurs due to fixed pattern noise which a solid-state image capturing element has.

Further, as the fixed pattern noise, there are one independent of an incident light amount on the solid-state image capturing element, and one dependent on the incident light amount on the solid-state image capturing element. Then, the fixed pattern noise independent of the incident light amount on the solid-state image capturing element can be detected in a light-shielded state for example. However, for the fixed pattern noise dependent on the incident light amount, it is necessary to adjust a detection environment.

Here, an example of a detecting method of the fixed pattern noise dependent on the incident light amount will be described. In the fixed pattern noise, basically there is no change due to position or time. From this fact, for example, the fixed pattern noise dependent on the incident light amount can be detected as described in the following (1) and (2). That is to say, (1) a subject for which the output of the ideal solid-state image capturing element is known is captured with an actual solid-state image capturing element, and outputs from this solid-state image capturing element are averaged in a time direction to remove random noise. (2) The difference between the output obtained as a result of this and the output of the ideal solid-state image capturing element is taken.

More specifically, for example, the fixed pattern noise dependent on the incident light amount can be detected as described in the following (1) and (2). That is to say, (1) a subject with a uniform light amount is photographed, and random noise is removed by passing through a LPF (low-pass filter) in a time direction. (2) Thereafter, the average value of the entire imaging screen or of a partial area thereof is calculated, and the difference therebetween is taken.

Further, whether to use the average value of the entire imaging screen or the average value of a partial area can be selected depending on, for example, the shading amount and the random noise amount of an optical system, and desired detection sensitivity of fixed pattern noise.

Further, for example, when the average value of the entire imaging screen is used, it is advantageous in view of random noise, but shading in the optical system is easily detected as an error. Conversely, when the average value of the partial area of the imaging screen is used, it is possible to cancel the shading in the optical system. However, the effect of removing random noise decreases, and remaining noise can be easily detected as an error.

Therefore, in detection of the fixed pattern noise dependent on the incident light amount, for example, to improve detection accuracy, it is important to select an optical system with as less shading as possible and take a wide area for calculating the average value.

As described above, for the fixed pattern noise dependent on the incident light amount, it is necessary to adjust a detection environment as described above. For example, it is not desirable that automatic detection is performed or the user is required to perform detection every time the power of the imaging apparatus is turned on. Accordingly, it is desired to perform detection of the fixed pattern noise and store the detected noise in, for example, the main body of the imaging apparatus in advance at the time of shipping of the product of the imaging apparatus or the like.

Further, in the head-detachable camera for example, since the fixed pattern noise data are information inherent to a camera head 20, it is desired to store them in a non-volatile storage medium in the camera head 20.

However, the data reading speed from the non-volatile storage medium (memory) is not fast. Accordingly, in general, when the power of the imaging apparatus is turned on for example, data are transferred once to the non-volatile memory such as an SDRAM, and a correction circuit performs a correcting operation using the data stored in the SDRAM.

Accordingly, for example, it is not possible to perform correction of the fixed pattern noise in the period until completion of the transfer processing of the fixed pattern noise from the storage area in the camera head 20 to the memory (SDRAM or the like) for the correction circuit.

Consequently, as described above, there is a possibility that a problem of elongation of data transfer time arises due to increase in fixed pattern noise data amount accompanying increase in pixels of the image sensor.

FIG. 1 is a diagram illustrating an example of the structure of an imaging apparatus according to an embodiment. Numeral 1 denotes an imaging apparatus, numeral 10*a* denotes a lens, numeral 10 denotes a scope, numeral 20 denotes a camera head, numeral 21 denotes an image sensor (image capturing unit), numeral 22 denotes a storage unit (flash memory), numeral 30 denotes a CCU, numeral 31 denotes a signal processing unit, numeral 32 denotes a storage unit (SDRAM), numeral 33 denotes a CPU, numeral 40 denotes a light source, numeral 50 denotes a camera cable, numeral 60 denotes an optical fiber, numeral 70 denotes a signal cable, and numeral 80 denotes a video display device (LCD).

Here, the imaging apparatus (endoscope) 1 is provided with, for example, the objective lens 10*a* at a distal end thereof. Further, there are disposed the scope 10 to be inserted into a subject to be inspected and the image sensor 21 (image capturing unit) provided in the camera head 20 on an imaging plane of the objective lens 10*a*.

Then, a captured video signal captured in this image sensor 21 (image capturing unit) is outputted to the CCU 30 via the camera cable 50.

Further, the camera head 20 is provided with the storage unit (flash memory) 22 storing data of fixed pattern noise related to respective image capturing elements of the image sensor 21 (image capturing unit).

In this embodiment, for example, when the power of the imaging apparatus 1 is turned on first, the camera head 20 performs spatial thinning processing of data of fixed pattern noise (fixed pattern noise data of all the pixels) related to the respective image capturing elements of the image sensor 21 (image capturing unit) stored in the storage unit (flash memory) 22, and outputs the result to the CCU 30 (thinned data). The CCU 30 receives the thinned data. The thinning processing means, for example, to extract fixed pattern noise data of part of pixels from the fixed pattern noise data of all the pixels (one kind of sampling). At this time, regular thinning (sampling) facilitates interpolation processing in the CCU 30.

The CCU 30 performs interpolation processing using the thinned data to generate fixed pattern data of an untransmitted part (lacking part of the thinned data). The generation of the fixed pattern data of the untransmitted part can be performed while receiving the thinned data. Accordingly, when most of the receiving time of the thinned data passes, it becomes possible to output video on which noise data of the image capturing elements are reflected.

Thus, if the transmission time of the thinned data is 4.5 seconds when transmission of all the data of fixed pattern noise stored in the storage unit (flash memory) 22 takes about 9 seconds, it becomes possible to reduce the time taken for outputting video on which noise data of the image capturing elements are reflected to about 4.5 seconds, which is about half ($\frac{1}{2}$).

Further, in parallel with the interpolation processing, the camera head 20 outputs the fixed pattern data of the untransmitted part (lacking part of the spatially thinned data) stored in the storage unit (flash memory) 22 to the CCU 30. The CCU 30 receives the fixed pattern data of the untransmitted part (lacking part of the spatially thinned data) outputted from the camera head 20.

Next, the CCU 30 replaces the data generated by the interpolation processing with the fixed pattern data of the untransmitted part (lacking part of the spatially thinned data), thereby obtaining the fixed pattern noise data of all the pixels. Then, in this embodiment, the CCU 30 uses the obtained fixed pattern noise data of all the pixels to perform video processing of a video signal.

In other words, in this embodiment, for example, part of data related to the image capturing elements (data of fixed pattern noise related to the respective image capturing elements of the image sensor 21) stored in the storage unit (flash memory) 22 is outputted to the CCU 30. The CCU 30 receives the captured video signal outputted from the camera head 20.

Further, the CCU 30 receives the part of the data related to the image capturing elements outputted from the camera head 20, and uses this received part of the data related to the image capturing elements to perform supplement processing of the data (which will be described later). The contents of these processes are controlled by the CPU 33, and stored in the storage unit (SDRAM) for example.

Further, the CCU 30 performs video processing of the captured video signal outputted from the camera head 20 using the supplement processed data related to the image capturing elements, and outputs a video signal. These processes are controlled by the CPU 33. The video display unit (LCD) 80 receives the video signal outputted from the CCU 30, and displays and outputs video.

Further, this imaging apparatus 1 includes the light source 40 which exposes the range of performing the above-described image capturing to light and the optical fiber 60 which introduces light outputted from this light source 40 to a distal end part of the scope 10.

Further, the camera cable 50 has, for example, signal lines for transmitting/receiving a captured video signal and a control signal between the camera head 20 and the CCU 30, a power line for supplying power from the CCU 30 to the camera head 20, and the like.

Further, the above-described image sensor 21 may be structured of what is called a three-plate type or a single-plate type. For example, in an image sensor of the single-plate type, color filters are provided above respective pixels of the image sensor (CMOS sensor), and for example, an electric signal outputted from the image sensor (CMOS sensor) is color separated into R, G, B signals in a predetermined circuit. In the single-plate type image sensor, it is not necessary to bond a prism (not illustrated) and the image sensor (CMOS sensor), and thus it can be produced inexpensively.

Figure 2A:
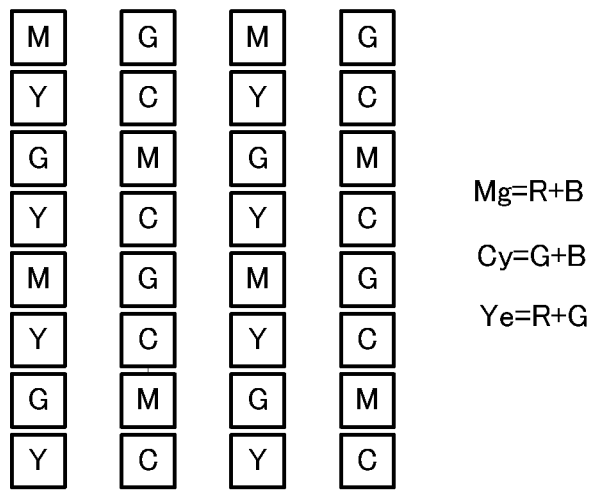
FIG. 2A and FIG. 2B are diagrams illustrating examples of arrays of color filters used for the imaging apparatus according to the embodiment.
Figure 2B:
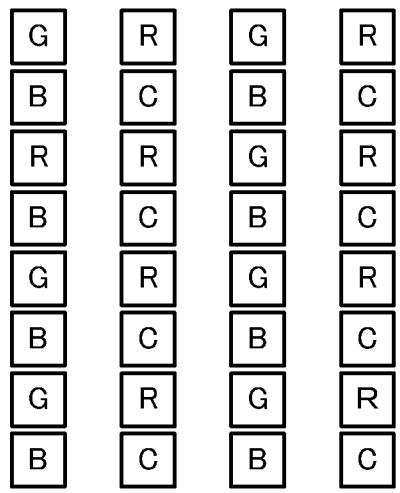

FIG. 2A and FIG. 2B are diagrams illustrating examples of arrays of color filters used for the imaging apparatus according to the embodiment. There are various methods for arrays of color filters, and examples of such methods will be described here.

FIG. 2A is an example of color filters in a color difference line sequential array. In the color difference line sequential array, color filters of M(R+B), Y(G+B), C(R+G) called a complementary color and a color filter of G are arranged in the array illustrated in FIG. 2A. In the color difference line sequential array, two primary colors (R+G, G+B, R+G) are obtained in one pixel for example, by using the complementary colors M, Y, C.

Incidentally, for example, the color difference line sequential array is preferable for an image sensor driven by interlaced scanning.

FIG. 2B is an example of a color filter in a Bayer array. In this Bayer array, color filters of primary colors (R, G, B) are arranged so that the color filters of G are double the color filters of R and B. This is because human eyes are sensitive to green light. Thus, it is possible to increase the resolution of captured video.

Incidentally, the image sensor 21 of the imaging apparatus (endoscope apparatus) 1 according to this embodiment may employ color filters in a different array.

Figure 3:
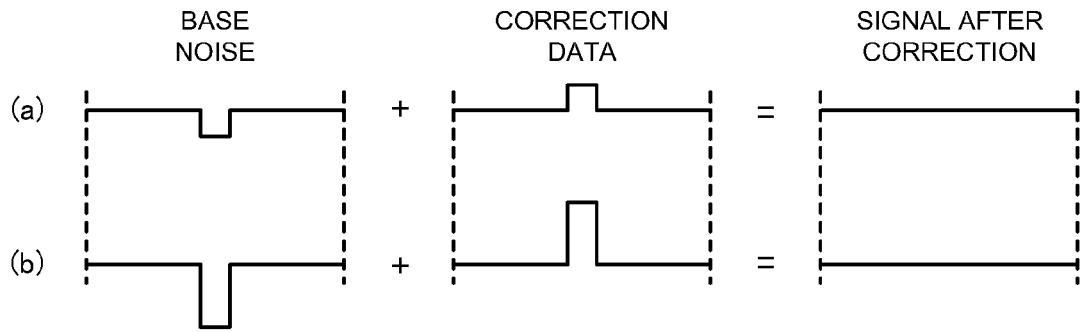
FIG. 3 is a diagram illustrating an example of data related to the image capturing elements in the imaging apparatus according to the embodiment.

FIG. 3 is a diagram illustrating an example of data related to the image capturing elements in the imaging apparatus according to the embodiment.

In this embodiment, base noise whose level (intensity) does not change due to external environment, such as temperature and luminance for example, are corrected. Accordingly, for example, the base noise of the CMOS sensor which the image sensor 21 has is measured in each pixel in advance, and correction data to cancel this base noise as illustrated in FIG. 3 are made to correspond to the pixels and stored in, for example, the flash memory 22. Then, the correction data stored in the flash memory 22 are added to the captured video signal outputted from the image sensor 21. Thus the video signal is corrected.

Incidentally, it is also possible to measure the base noise by instructing the CMOS sensor to output a predetermined voltage (reference voltage) and checking deviation of the actually outputted voltage from the reference voltage in each pixel.

Figure 4:
FIG. 4 is a diagram illustrating an example of fixed pattern noise data of all the pixels of an image sensor in the imaging apparatus according to the embodiment.

FIG. 4 is a diagram illustrating an example of the fixed pattern noise data of all the pixels of the image sensor in the imaging apparatus according to the embodiment. Here, the fixed pattern noise data of all the pixels of the image sensor 21 which are detected in advance are illustrated.

The fixed pattern noise data of all the pixels of the image sensor 21 to be transmitted to the CCU 30 are stored in, for example, the flash memory 22. As illustrated in FIG. 4, for pixels to which "D" is added, the fixed pattern noise data are detected in advance.

Figure 5A:
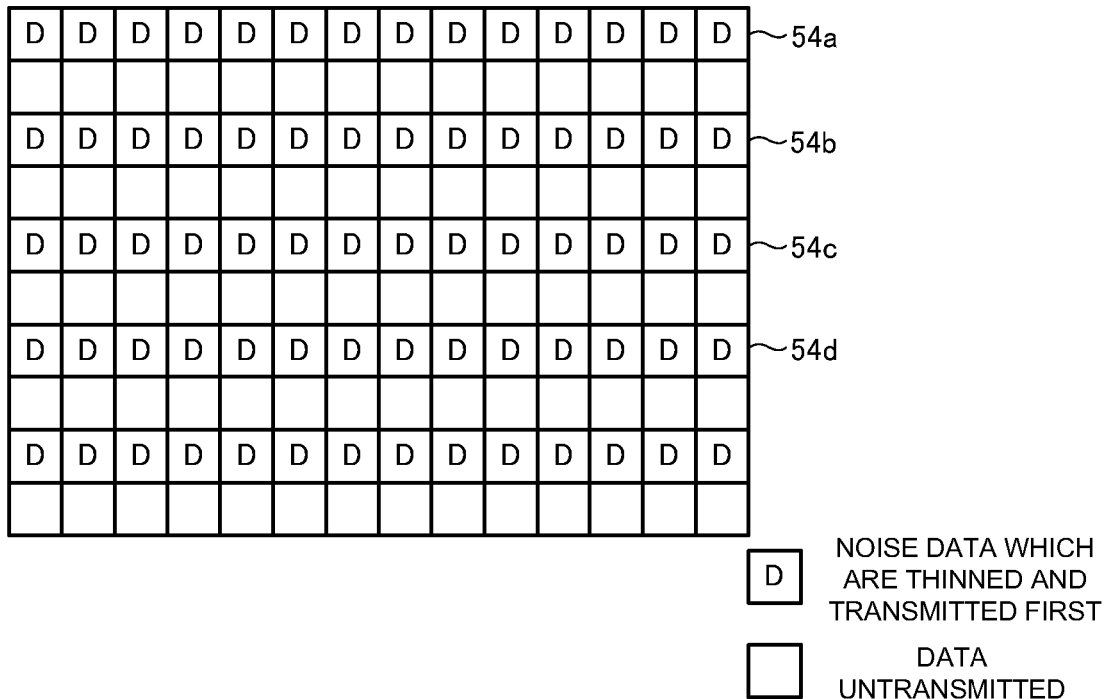
FIG. 5A and FIG. 5B are diagrams illustrating an example of the fixed pattern noise data to be thinned and transmitted in the imaging apparatus according to the embodiment and an interpolation example of the noise data.
Figure 5B:
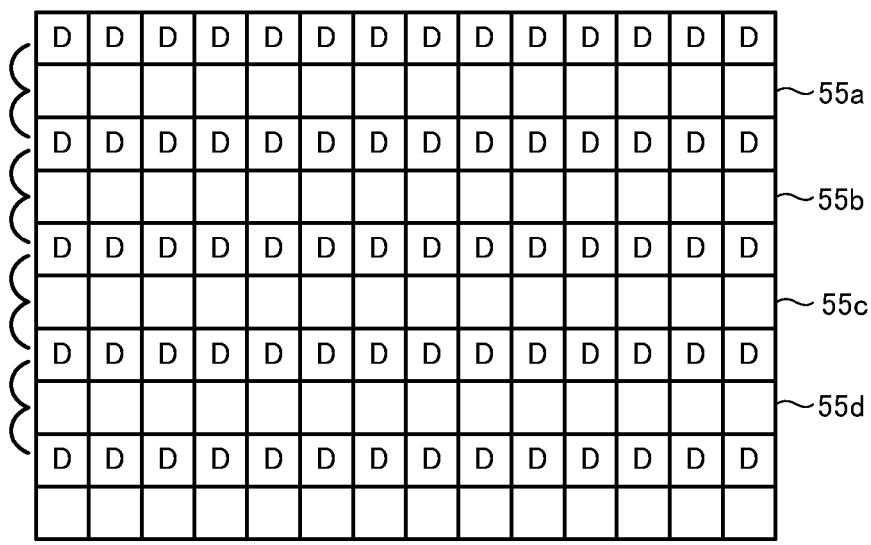

FIG. 5A and FIG. 5B are diagrams illustrating an example of the fixed pattern noise data to be thinned and transmitted in the imaging apparatus according to the embodiment and an interpolation example of the noise data.

FIG. 5A is a transmission example 1 of the fixed pattern noise data which are thinned and transmitted from the camera head 20 to the CCU 30. Here, the thinning processing (sampling processing) is performed first on every other line (row), and the amount of thinned data that is half the whole amount is transmitted.

In this embodiment, the camera head 20 first transmits part of the whole fixed pattern noise data, specifically half the amount of the whole data, stored in the flash memory 22 as thinned data to the CCU 30.

FIG. 5B is an interpolation example of the fixed pattern noise data in the CCU 30.

The CCU 30 receives the above-described thinned data and stores them in the SDRAM 32. Further, the CCU 30 is controlled by the CPU 33 to receive the thinned data and meanwhile perform supplement processing using the thinned data, thereby creating supplement data for the fixed pattern noise data of the image sensor 21 which are needed for video processing the video signal. The supplement data are stored in, for example, the SDRAM 32 for supplementing a lacking part of the thinned data.

This supplement processing is performed as follows for example. Specifically, as illustrated in FIG. 5B, a supplement data row 55a is created from the first line (row) and the third line (row) of the thinned data.

Similarly, a supplement data row 55b is created from the third line (row) and the fifth line (row) of the thinned data. Further, similarly, a supplement data row 55c is created from the fifth line (row) and the seventh line (row) of the thinned data. Further, similarly, a supplement data row 55d is created from the seventh line (row) and the ninth line (row) of the thinned data, thereby creating the supplement data of the fixed pattern noise data of the image sensor 21.

Further, although the supplement data are created from the two lines (rows) before and after a line (row) lacking data in the above description, it is possible to create the supplement data using, for example, the data of the line (row) located before the line (row) lacking data without changing them.

By this supplement processing, the fixed pattern noise data (supplemented version) of all the pixels of the image sensor 21 are stored in the SDRAM 32. Then, the video signal is video processed using the fixed pattern noise data (supplemented version) of all the pixels of the image sensor 21, so as to output video.

Figure 6A:
FIG. 6A and FIG. 6B are diagrams illustrating other examples of the fixed pattern noise data to be thinned and transmitted in the imaging apparatus according to the embodiment and interpolation of the noise data.
Figure 6B:

FIG. 6A and FIG. 6B are diagrams illustrating other examples of the fixed pattern noise data to be thinned and transmitted in the imaging apparatus according to the embodiment and interpolation of the noise data.

Here, first there is transmitted the amount of thinned data, which is half the amount of the whole data, resulting from performing thinning processing on every other pixel (one line (one column)) as illustrated in FIG. 6A. That is, also in this embodiment, the camera head 20 first transmits part of the whole fixed pattern noise data, specifically half the amount of the whole data, stored in the flash memory 22 as thinned data to the CCU 30.

FIG. 6B is an interpolation example of the fixed pattern noise data in the CCU 30.

The CCU 30 receives the above-described thinned data and stores them in the SDRAM 32. Further, the CCU 30 is controlled by the CPU 33 to receive the thinned data and meanwhile perform supplement processing using the thinned data, thereby creating supplement data for the fixed pattern noise data of the image sensor 21 which are needed for video processing the video signal. The supplement data are stored in, for example, the SDRAM 32 for supplementing a lacking part of the thinned data.

This supplement processing is performed as follows for example. Specifically, as illustrated in FIG. 6B, a supplement data column 65a is created from the first line (column) and the third line (column) of the thinned data. Similarly, a supplement data column 65b is created from the third line (column) and the fifth line (column) of the thinned data. Further, similarly, a supplement data column 65c is created from the fifth line (column) and the seventh line (column) of the thinned data. Further, similarly, a supplement data column 65d is created from the seventh line (column) and the ninth line (column) of the thinned data, thereby creating the supplement data of the fixed pattern noise data of the image sensor 21. Further, similarly, a supplement data column 65f is created from the ninth line (column) and the eleventh line (column) of the thinned data, thereby creating the supplement data of the fixed pattern noise data of the image sensor 21.

Further, although the supplement data are created from the two lines (columns) before and after a line (column) lacking data in the above description, it is possible to create the supplement data using, for example, the data of the line (column) located before the line (column) lacking data without changing them.

By this supplement processing, the fixed pattern noise data (supplemented version) of all the pixels of the image sensor 21 are stored in the SDRAM 32. Then, the video signal is video processed using the fixed pattern noise data (supplemented version) of all the pixels of the image sensor 21, so as to output video.

FIG. 7 is a diagram illustrating another example of the fixed pattern noise data to be thinned and transmitted in the imaging apparatus according to the embodiment.

Here, first there is transmitted the amount of thinned data, which is half the amount of the whole data, resulting from performing thinning processing on every other pixel in a checker form as illustrated in FIG. 7.

In this embodiment, the camera head 20 first transmits part of the whole fixed pattern noise data, specifically half the amount of the whole data resulting from performing thinning processing on every other pixel in a checker form, stored in the flash memory 22 as thinned data to the CCU 30.

Similarly to the above description, the CCU 30 receives the above-described thinned data and stores them in the SDRAM 32. Further, the CCU 30 is controlled by the CPU 33 to receive the thinned data and meanwhile perform supplement processing using the thinned data, thereby creating supplement data for the fixed pattern noise data of the image sensor 21 which are needed for video processing the video signal.

FIG. 8A to FIG. 8D are diagrams illustrating other examples of the fixed pattern noise data to be thinned and transmitted in the imaging apparatus according to the embodiment.

FIG. 8A is a transmission example of the fixed pattern noise data which are thinned and transmitted first from the camera head 20 to the CCU 30. Here, first, thinned data resulting from performing thinning processing to the amount of a ¼ line are transmitted. The symbol "1" means the thinned data to be transmitted first.

The camera head 20 transmits part of the whole fixed pattern noise data, specifically the amount of ¼ of the whole data of the symbol "1", stored in the flash memory 22 as thinned data to the CCU 30.

FIG. 8B is a transmission example of the fixed pattern noise data which are thinned and transmitted second from the camera head 20 to the CCU 30. Also here, first, thinned data of the next ¼ line are transmitted. The symbol "2" means the thinned data to be transmitted second.

The camera head 20 transmits part of the whole fixed pattern noise data, specifically the amount of ¼ of the whole data of the symbol "2", stored in the flash memory 22 as thinned data to the CCU 30.

FIG. 8C is a transmission example of the fixed pattern noise data which are thinned and transmitted third from the camera head 20 to the CCU 30. Also here, thinned data of the next ¼ line are transmitted. The symbol "3" means the thinned data to be transmitted third.

The camera head 20 transmits part of the whole fixed pattern noise data, specifically the amount of ¼ of the whole data of the symbol "3", stored in the flash memory 22 as thinned data to the CCU 30.

FIG. 8D is a transmission example of the fixed pattern noise data which are thinned and transmitted fourth from the camera head 20 to the CCU 30. Also here, thinned data of the next ¼ line are transmitted. The symbol "4" means the thinned data to be transmitted fourth.

The camera head 20 transmits part of the whole fixed pattern noise data, specifically the amount of remaining ¼ of the data of the symbol "4", stored in the flash memory 22 as thinned data to the CCU 30. Thus, the fixed pattern noise data of all the pixels are transmitted.

Similarly to the above description, the CCU 30 receives the above-described thinned data and stores them in the SDRAM 32. Further, the CCU 30 is controlled by the CPU 33 to receive the thinned data and meanwhile appropriately perform supplement processing using the thinned data, thereby creating supplement data for the fixed pattern noise data of the image sensor 21 which are needed for video processing the video signal.

FIG. 9A to FIG. 9D are diagrams illustrating other examples of the fixed pattern noise data to be thinned and transmitted in the imaging apparatus according to the embodiment.

Figure 9A:
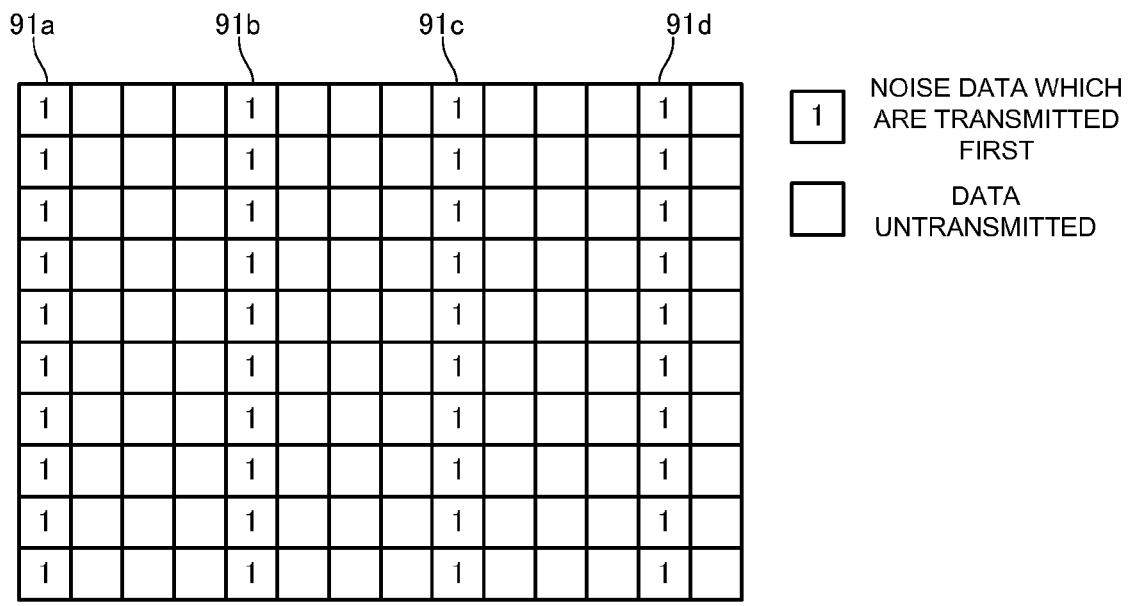

FIG. 9A is a transmission example of the fixed pattern noise data which are thinned and transmitted first from the camera head 20 to the CCU 30. Here, first, thinned data resulting from performing thinning processing to the amount of a ¼ line (column) are transmitted. The symbol "1" means the thinned data to be transmitted first.

The camera head 20 transmits part of the whole fixed pattern noise data, specifically the amount of ¼ of the whole data of the symbol "1", stored in the flash memory 22 as thinned data to the CCU 30.

Figure 9B:
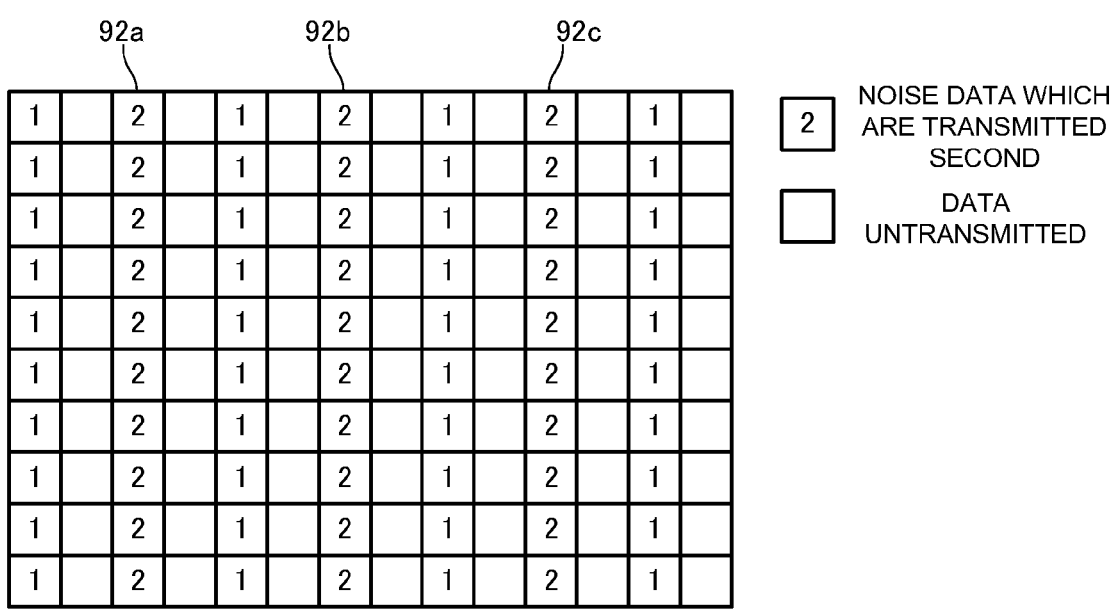

FIG. 9B is a transmission example of the fixed pattern noise data which are thinned and transmitted second from the camera head 20 to the CCU 30. Also here, thinned data of the next ¼ line (column) are transmitted. The symbol "2" means the thinned data to be transmitted second.

The camera head 20 transmits part of the whole fixed pattern noise data, specifically the amount of ¼ of the whole data of the symbol "2", stored in the flash memory 22 as thinned data to the CCU 30.

FIG. 9C is a transmission example of the fixed pattern noise data which are thinned and transmitted third from the camera head 20 to the CCU 30. Also here, thinned data of the next ¼ line (column) are transmitted. The symbol "3" means the thinned data to be transmitted third.

The camera head 20 transmits part of the whole fixed pattern noise data, specifically the amount of ¼ of the whole data of the symbol "3", stored in the flash memory 22 as thinned data to the CCU 30.

FIG. 9D is a transmission example of the fixed pattern noise data which are thinned and transmitted fourth from the camera head 20 to the CCU 30. Also here, thinned data of the next ¼ line (column) are transmitted. The symbol "4" means the thinned data to be transmitted fourth.

The camera head 20 transmits part of the whole fixed pattern noise data, specifically the amount of remaining ¼ of the data of the symbol "4", stored in the flash memory 22 as thinned data to the CCU 30. Thus, the fixed pattern noise data of all the pixels are transmitted.

Similarly to the above description, the CCU 30 receives the above-described thinned data and stores them in the SDRAM 32. Further, the CCU 30 is controlled by the CPU 33 to receive the thinned data and meanwhile appropriately perform supplement processing using the thinned data, thereby creating supplement data for the fixed pattern noise data of the image sensor 21 which are needed for video processing the video signal.

FIG. 10A to FIG. 10D are diagrams illustrating other examples of the fixed pattern noise data to be thinned and transmitted in the imaging apparatus according to the embodiment.

Figure 10A:
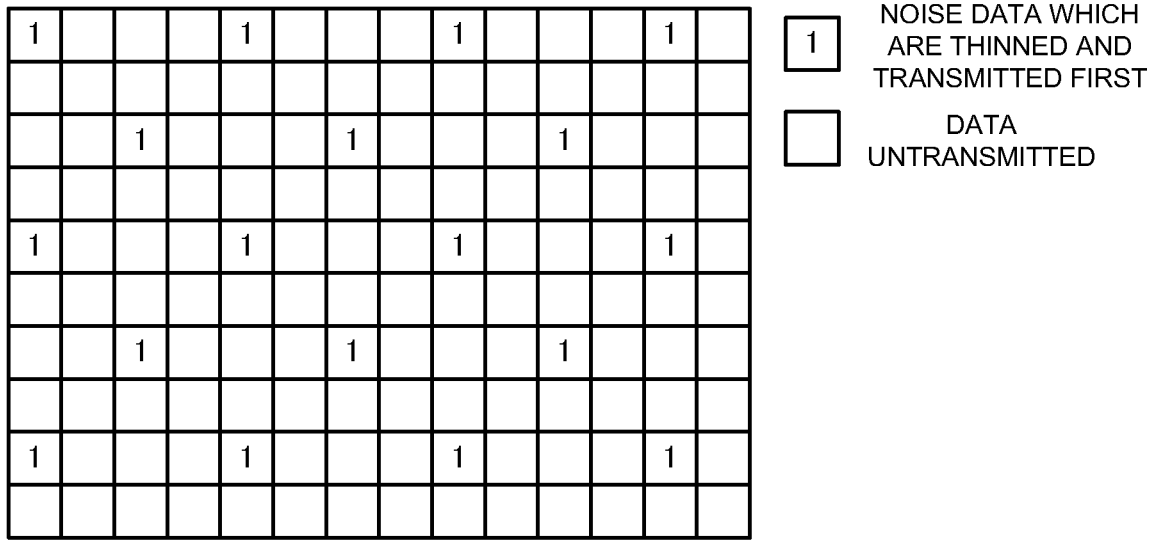

FIG. 10A is a transmission example of the fixed pattern noise data which are thinned and transmitted first from the camera head 20 to the CCU 30. Here, first, thinned data resulting from performing thinning processing as illustrated in FIG. 10A are transmitted. The symbol "1" means the thinned data to be transmitted first.

The camera head 20 transmits part of the whole fixed pattern noise data, specifically the data of the symbol "1", stored in the flash memory 22 as thinned data to the CCU 30.

Figure 10B:
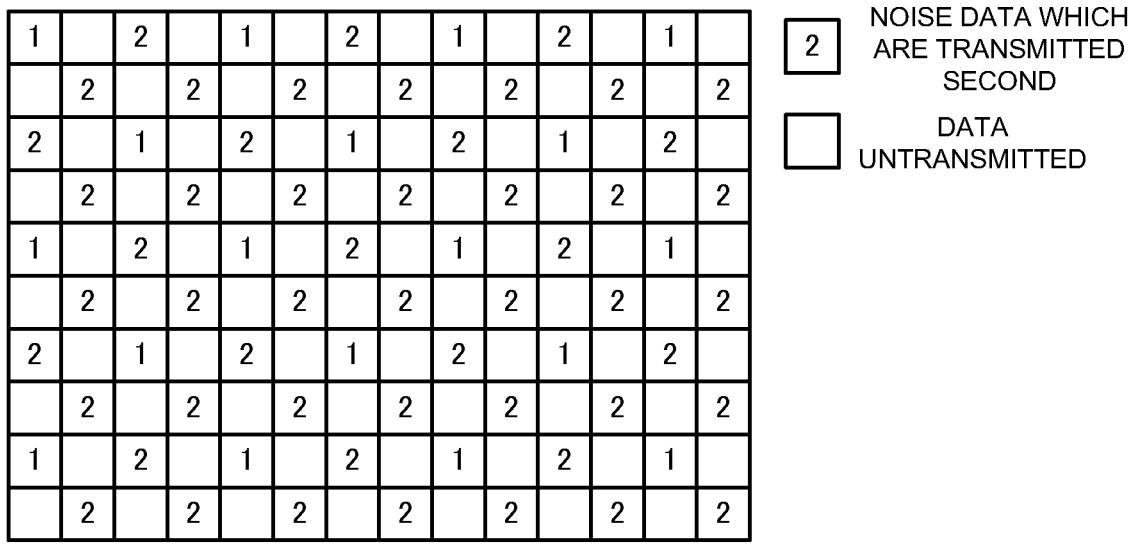

FIG. 10B is a transmission example of the fixed pattern noise data which are thinned and transmitted second from the camera head 20 to the CCU 30. Also here, thinned data as illustrated in FIG. 10B are transmitted. The symbol "2" means the thinned data to be transmitted second.

The camera head 20 transmits part of the whole fixed pattern noise data, specifically the data of the symbol "2", stored in the flash memory 22 as thinned data to the CCU 30.

FIG. 10C is a transmission example of the fixed pattern noise data which are thinned and transmitted third from the camera head 20 to the CCU 30. Also here, thinned data as illustrated in FIG. 10C are transmitted. The symbol "3" means the thinned data to be transmitted third.

The camera head 20 transmits part of the whole fixed pattern noise data, specifically the data of the symbol "3", stored in the flash memory 22 as thinned data to the CCU 30.

FIG. 10D is a transmission example of the fixed pattern noise data which are thinned and transmitted fourth from the camera head 20 to the CCU 30. Also here, thinned data as illustrated in FIG. 10D are transmitted. The symbol "4" means the thinned data to be transmitted fourth.

The camera head 20 transmits part of the whole fixed pattern noise data, specifically the data of the symbol "4", stored in the flash memory 22 as thinned data to the CCU 30. Thus, the fixed pattern noise data of all the pixels are transmitted.

Similarly to the above description, the CCU 30 receives the above-described thinned data and stores them in the SDRAM 32. Further, the CCU 30 is controlled by the CPU 33 to receive the thinned data and meanwhile appropriately perform supplement processing using the thinned data, thereby creating supplement data for the fixed pattern noise data of the image sensor 21 which are needed for video processing the video signal.

Figure 11B:
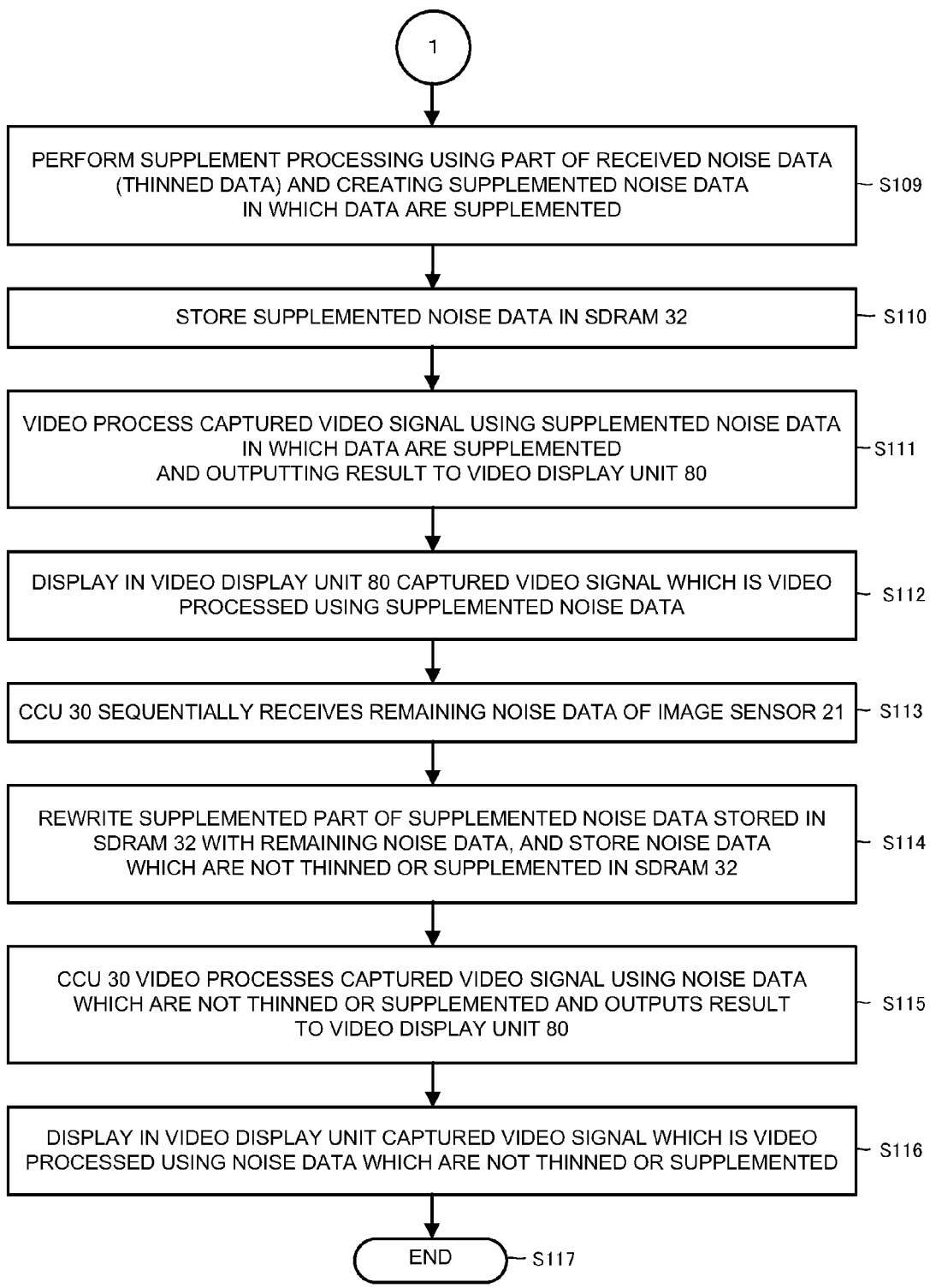

FIGS. 11A and 11B are flowcharts describing operation of the imaging apparatus according to the embodiment.

Symbol S100 denotes a starting step here. Subsequently, the process proceeds to step S101.

Step S101 is a step of turning on the power of the imaging apparatus 1. Subsequently, the process proceeds to step S102.

Step S102 is a step of starting, for example, image capturing in response to the turning on of the power of the imaging apparatus 1. Subsequently, the process proceeds to step S103.

Step S103 is a step of outputting a captured video signal from the camera head 20 to the CCU 30. Subsequently, the process proceeds to step S104.

Step S104 is a step in which the CCU 30 video processes the captured video signal without using noise data of the image sensor 21 (image capturing elements) and outputs the result to the video display unit 80. Subsequently, the process proceeds to step S105.

Step S105 is a step of displaying and outputting in the video display unit 80 the captured video which is video processed without using the noise data. Subsequently, the process proceeds to step S106.

Step S106 is a step of outputting part of noise data (for example, thinned data) of the image sensor 21 (image capturing elements) stored in the flash memory 22 from the camera head 20 to the CCU 30. Subsequently, the process proceeds to step S107.

Step S107 is a step of outputting the remaining noise data of the image sensor 21 stored in the flash memory 22 from the camera head 20 to the CCU 30. Subsequently, the process proceeds to step S108.

Step S108 is a step of receiving part of the noise data (thinned data) of the image sensor 21 and storing the data in the SDRAM 32 of the CCU 30. Subsequently, the process proceeds to step S109.

Step S109 is a step of performing supplement processing using part of the received noise data (thinned data) and creating supplemented noise data in which data are supplemented. Subsequently, the process proceeds to step S110.

Step S110 is a step of storing the supplemented noise data in the SDRAM 32. Subsequently, the process proceeds to step S111.

Step S111 is a step of video processing the captured video signal using the supplemented noise data in which data are supplemented and outputting the result to the video display unit 80. Subsequently, the process proceeds to step S112.

Step S112 is a step of displaying and outputting in the video display unit 80 the captured video signal which is video processed using the supplemented noise data. Subsequently, the process proceeds to step S113.

Step S113 is a step in which the CCU 30 sequentially receives the remaining noise data of the image sensor 21. Subsequently, the process proceeds to step S114.

Step S114 is a step of rewriting the supplemented part of the supplemented noise data stored in the SDRAM 32 with the remaining noise data, and storing the noise data which are not thinned or supplemented in the SDRAM 32. Subsequently, the process proceeds to step S115.

Step S115 is a step in which the CCU 30 video processes the captured video signal using the noise data which are not thinned or supplemented and outputs the result to the video display unit 80. Subsequently, the process proceeds to step S116.

Step S116 is a step of displaying and outputting in the video display unit the captured video signal which is video processed using the noise data which are not thinned or supplemented. Subsequently, the process proceeds to step S117.

Step S117 is an ending step, and the process here is finished.

Note that although the above description gives an example in which the captured video signal is video processed without using the noise data in the image sensor 21 (image capturing element) in response to the turning on of the power of the imaging apparatus 1 and the result is outputted to the video display unit 80, it is also possible to omit this processing when it is desired to reflect the noise data of the image sensor 21 (image capturing elements) for example.

In this embodiment, the imaging apparatus includes a captured video signal outputting unit (camera head 20) outputting a captured video signal related to video captured using an image capturing elements (image sensor 21).

Further, the imaging apparatus includes a data outputting unit (camera head 20) outputting part of data (for example, thinned data) related to the image capturing elements (image sensor 21) stored in a storage unit (flash memory 22).

Further, the imaging apparatus includes a supplement processing unit (CCU 30) receiving the outputted part of the data (for example, thinned data) related to the image capturing elements and using the received part of the data (for example, thinned data) related to the image capturing elements to perform supplement processing of the data.

Further, the imaging apparatus includes a video processing unit (CCU 30) performing video processing of the outputted captured video signal using the supplement processed data and outputting a video signal. The video processing unit (CCU 30) uses fixed pattern data or the like related to the image capturing elements in which the supplemented part is replaced to perform video processing of the outputted captured video signal.

With the above-described structure, the embodiment of the present invention allows to provide an imaging apparatus in which the time taken for outputting video on which noise data of the image capturing elements are reflected is reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging apparatus, comprising:
   a captured video signal receiving unit configured to receive a captured video signal from image capturing elements;
   a first data receiving unit configured to receive a first part of a predetermined correction data for the image capturing elements stored in a storage unit;
   a supplement processing unit configured to generate supplement data used for supplementing the first part of the predetermined correction data based on the first part of the predetermined correction data received by first data receiving unit;
   a video processing unit configured to perform video processing of the received captured video signal by using the first part of the predetermined correction data and the supplement data to generate a video signal;
   a second data receiving unit configured to receive a second part of the predetermined correction data, the second part of the predetermined correction data being different than the first part of the predetermined correction data; and
   a replacing unit configured to replace the supplement data with the second part of the predetermined correction data so as to perform video processing of the received captured video signal by the video processing unit.

2. The imaging apparatus according to claim, wherein the video processing unit uses the first part of the predetermined correction data and the second part of the predetermined correction data replaced by the replacing unit to perform the video processing of the received captured video signal.

3. The imaging apparatus according to claim 1, further comprising a video display unit displaying and outputting video based on the video signal generated by the video processing unit.

4. The imaging apparatus according to claim 1,
   wherein the predetermined correction data constitutes fixed pattern noise of the image capturing elements.

5. The imaging apparatus according to claim 1,
   wherein the predetermined correction data corresponds to a plurality of image capturing elements.

6. The imaging apparatus according to claim 1,
   wherein the first part of the predetermined correction data is outputted by sampling processing.

7. The imaging apparatus according to claim 6,
   wherein the sampling processing is performed for every line of the image capturing elements.

8. The imaging apparatus according to claim 6,
   wherein the sampling processing is performed on every element of the image capturing elements.

9. The imaging apparatus according to claim 6,
   wherein the sampling processing is performed in a checker form on every element of the image capturing elements.

10. The imaging apparatus according to claim 6,
    wherein the sampling processing is performed a plurality of times.

11. An imaging method, comprising:
    receiving a captured video signal from image capturing elements;
    receiving a first part of a predetermined correction data for the image capturing elements stored in a storage unit;
    generating supplement data used for supplementing the first part of the predetermined correction data based on the received first part of the predetermined correction data;

performing video processing of the received captured video signal by using the first part of the predetermined correction data and the supplement data to generate a video signal;

receiving a second part of the predetermined correction data other than the first part of the predetermined correction data in the predetermined correction data; and replacing the supplement data with the second part of the predetermined correction data so as to perform video processing of the received captured video signal.

12. The imaging method according to claim 11, wherein, in the video processing, the first part of the predetermined correction data and the second part of the predetermined correction data are used to perform video processing of the received captured video signal.

13. The imaging method according to claim 11, further comprising, displaying and outputting video based on the video signal generated by the video processing.

14. The imaging method according to claim 11, wherein the predetermined correction data constitutes fixed pattern noise of the image capturing elements.

15. The imaging method according to claim 11, wherein the predetermined correction data corresponds to a plurality of image capturing elements.

16. The imaging method according to claim 11, wherein the first part of the predetermined correction data is outputted by sampling processing.

17. The imaging method according to claim 16, wherein the sampling processing is performed for every line of the image capturing elements.

18. The imaging method according to claim 16, wherein the sampling processing is performed on every element of the image capturing elements.

* * * * *